Nov. 3, 1942.  W. DE BACK  2,300,407
VINER
Filed March 1, 1941  2 Sheets-Sheet 1
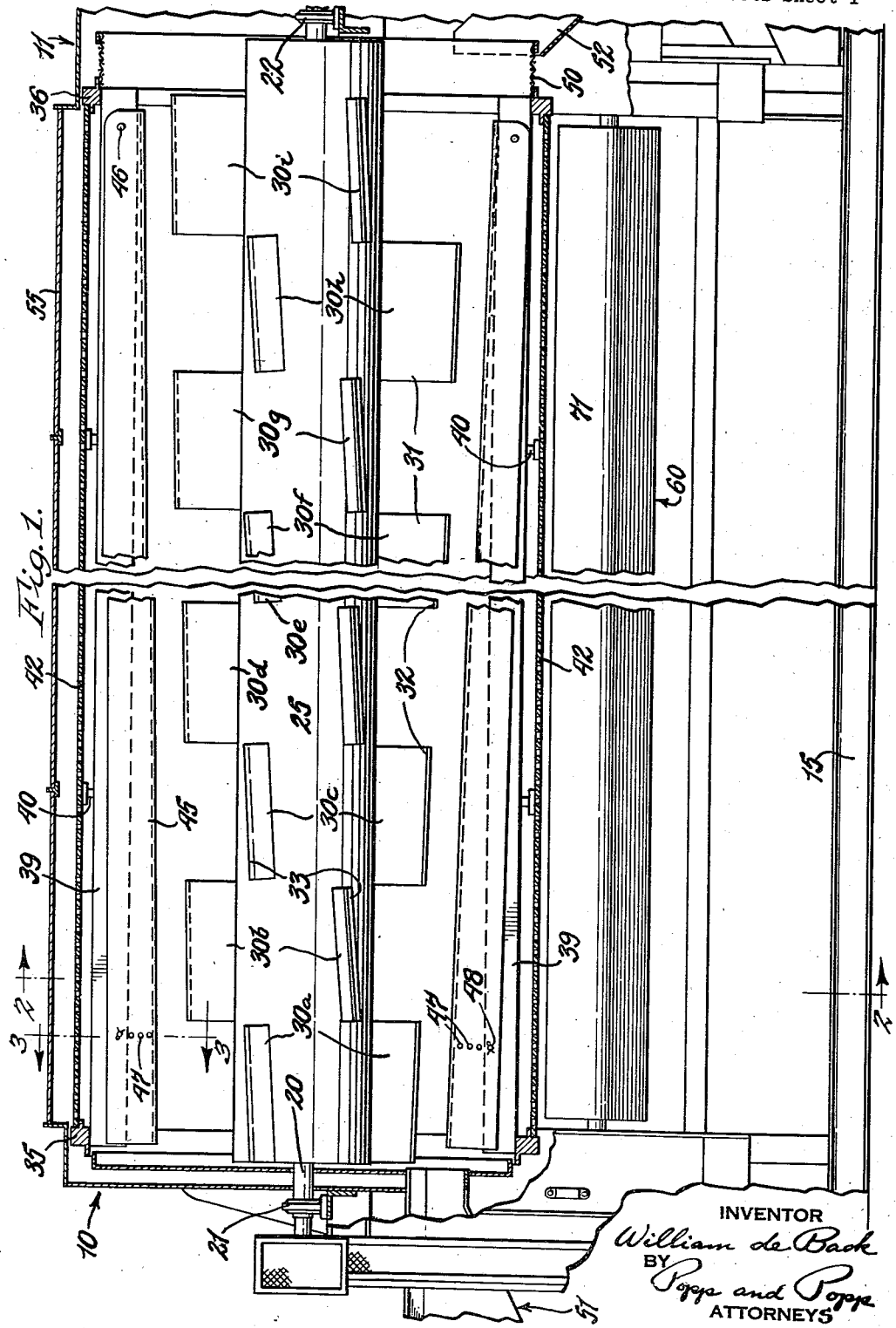
INVENTOR
William de Back
BY
Popp and Popp
ATTORNEYS Nov. 3, 1942. W. DE BACK 2,300,407
VINER
Filed March 1, 1941 2 Sheets-Sheet 2

INVENTOR
William de Back
BY
Popp and Popp
ATTORNEYS

Patented Nov. 3, 1942

2,300,407

UNITED STATES PATENT OFFICE 2,300,407

VINER

William de Back, Niagara Falls, N. Y., assignor to Chisholm - Ryder Company, Incorporated, Niagara Falls, N. Y., a corporation of New York Application March 1, 1941, Serial No. 381,361

4 Claims. (Cl. 130—30)

This invention relates to viners such as are used to thresh green peas and lima beans for commercial packing. The vines having been cut in the field with a mowing machine are fed into the viner and the peas or lima beans are removed while the pods are still attached to the vines. More particularly, the viner forming the subject of the present invention is directed to the form of viner shown in my copending patent application, Serial No. 347,881, filed July 27, 1940.

In viners of this general class the principle of impact is employed to remove the peas or lima beans from the pods, the pods containing more or less air as well as peas. The impact causes distortion and produces a pressure within the pod that causes it to burst at its weakest point—where the two halves are joined. In operation, the vines with their pods are dropped onto an automatic feeder which feeds them into the reel of the viner. This reel is formed by longitudinal ribs which support perforated rubber screens to form a polygonal structure. The screens and ribs in rotating form pockets thereby causing the reel to act as a bucket elevator lifting the vines to a position near the top. As they reach sufficient elevation they slide off the ribs and come in contact with rapidly revolving beaters attached to a beating cylinder housed within the reel. When they are first struck some of the pods are opened and the vines acquire the speed of the beaters and are thrown against other lifting ribs where more pods are opened by impact. The beaters are adjustably set at an angle to the axis of the beater cylinder so that the vines are gradually propelled along the reel. By the time they have reached the discharge end of the reel substantially all of the pods have been opened. The separated peas or lima beans fall to the bottom of the reel as soon as they are released from the pods and pass through the perforations in the rubber screens onto means arranged below the reel which separate the peas or lima beans from the chaff and separately discharge the same.

One of the principal objects of this invention is to provide such a viner having improved efficiency in operation and production by insuring a uniformity in the distribution of the threshing the full length of the reel and also to provide a viner which is so designed that there is a reduction in the damage to tender peas and a smaller number of splits produced, particularly in the tender peas, thereby increasing the production of fancy peas.

Another object is to provide a much more gentle threshing action at the feed end of the reel as compared with the threshing action at the discharge end so that the tender peas are threshed out by gentle blows delivered by beaters revolving at a slow peripheral speed before the vines pass on to the discharge end of the reel where more violent threshing action takes place to thresh out the more mature peas. This results in a reduction of injury to and splitting of the tender peas with a consequent greater production of fancy peas.

Another object is to provide the above differential in the peripheral speeds of the beaters with a beater mechanism in which all of the beaters are mounted on the same beater cylinder and in which all of the beaters travel at the same angular speed.

Another object is to provide such a viner in which the vines are progressively subjected to beating action of gradually increasing violence as they traverse the length of the reel thereby to subject the individual pods only to that degree of force necessary to open them and to extend the threshing the full length of the reel.

Another object is to provide a reel in which the lifting ribs are arranged to properly coact with the beaters traveling at different peripheral speeds.

Another object of the invention is to provide simple means for adjusting the relation of the lifting ribs to the beaters thereby to obtain the maximum threshing efficiency for the particular vines being handled.

Other objects are to provide such a viner which is simple in construction, considering the function which it performs and will stand up under conditions of severe and constant use without getting out of order or requiring repairs.

In the accompanying drawings:

Fig. 1 is a fragmentary vertical longitudinal section, with parts in elevation, of a viner embodying my invention.

Figure 3:
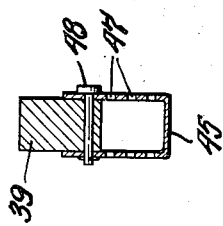
Fig. 3 is a vertical transverse section through one of the lifting ribs of the reel, this section being taken on line 3—3, Fig. 1.

The supporting frame for the viner is shown as including an end head 10 at the feeding end of the machine and an end head 11 at the discharge end thereof. The upper ends of these end heads are preferably of semi-circular form and each is composed of structural members and sheet metal enclosing plates of any suitable form to rotatably support and enclose the ends of the reel and beater cylinder which are arranged between these end heads. The end heads so formed are shown as cross connected by upper longitudinal side channels 12 and 13 and by lower longitudinal base channels 14 and 15.

The beater mechanism is shown as supported and driven by a shaft 20 one end of which is journalled in a bearing 21 carried by the end head 10 at the feeding end of the viner and the other end of which is journaled in a bearing 22 carried by the end head 11 at the discharge end of the viner. This shaft is rotated in a clockwise direction, as viewed in Fig. 2, at a speed of about 165 R. P. M., by any suitable driving mechanism (not shown).

The shaft 20 supports a concentric beater cylinder 25. This beater cylinder is shown as being made of sheet metal and as connected with the beater shaft 20 by means of circular end heads 26 and can be internally reinforced in any suitable manner (not shown). This beater cylinder 25 carries a plurality of annular series of beaters indicated by the numeral 30, the beaters of the several series being distinguished by the suffixes $a$ to $i$. The several series of the beaters are shown as arranged in successive zones beginning at the receiving end of the beater cylinder 25 and each series being shown as comprising three beaters arranged in annular equally spaced relation in the corresponding zone. Each of these beaters comprises a flat plate 31 which can be secured to the beater cylinder 25 in any suitable manner to project radially outward therefrom and each is set at an angle to the axis of the beater cylinder so that as the beater cylinder is rotated in a clockwise direction, as viewed in Fig. 2, the vines are conveyed by the several series of beaters from the end head 10 at the inlet end of the viner toward the end head 11 at the discharge end thereof. The plate 31 of each beater is also flanged laterally at its outer edge so as to provide a trailing flange 32 and a leading nose 33.

The beaters 30 are not, however, of the same size. An important feature of the present invention resides in the fact that the series of beaters 30a at the inlet end of the viner are comparatively short, in a radial direction, extending only a relatively small distance outwardly from the beater cylinder 25, and that the series of beaters 30i at the discharge end of the viner are comparatively long, in a radial direction, and extend a relatively large distance outwardly from the beater cylinder 25. The series of beaters 30b—30h intermediate these two series 30a and 30i are of progressively increasing size, in a radial direction, the beaters of these series extending progressively a greater distance outwardly from the beater cylinder 25 as they approach the beaters 30i in the discharge zone of the beater mechanism. It will therefore be seen that while the beaters 30 are all mounted on the same cylinder 25 and hence all travel at the same angular speed, the beaters 30a at the inlet end of the viner have a comparatively slow peripheral speed and that the peripheral speeds of the several series of beaters gradually increase toward the discharge end of the viner, the series of beaters 30i in the final or discharge zone of the beater assembly having the highest peripheral speed.

As previously briefly explained, the beater cylinder 25 revolves within a reel. This reel includes a pair of circular end rings 35, 36 which can be of any suitable form, the outer faces forming tracks which ride upon a pair of flanged supporting rollers 37 carried by each end head 10 and 11 of the viner. These end rings 35, 36 of the reel are shown as connected by six ribs 39 which can be of any suitable construction. At spaced intervals along the outer face of each of these ribs 39, spacer posts 40 are welded. The frames 41 of the rubber screens 42 which enclose the reel are secured in any suitable manner to the outer ends of these spacer posts so as to provide spaces 43 between the screen frames and the ribs 39, which spaces permit the peas or lima beans to escape from the buckets formed by the ribs and screens as the reel rotates. Any suitable means (not shown) can be provided for rotating the reel in the same direction as the beater cylinder 25 but at a slower speed.

The end rings 35 and 36 are shown as being of the same size and the ribs 39 are connected to these end rings in parallel relation to one another and to the axis of the reel and the beater cylinder so as to be in cylindrical arrangement. For the purpose of coacting with the beaters 30 on the beater cylinder 25, each of these ribs 39 is shown as supporting a lifting rib 45. An important feature of the invention resides in the fact that these lifting ribs 45 are disposed in conical arrangement, their inner faces being arranged approximately parallel with the flanges 32 of the several series of beaters. A further feature of the invention resides in the provision of means for adjusting the ends of the several lifting ribs at the inlet end of the viner toward and from the axis of rotation of the reel so as to permit of adjusting the space between these ribs and the beaters to suit the particular vines being handled and to obtain the maximum threshing efficiency. For this purpose each of the lifting ribs 45 is shown as being made of sheet metal formed into channel form in cross section, the legs of each of these lifting ribs embracing the corresponding rib 39, as best shown in Fig. 3. At the discharge end of the viner the legs of each of these lifting ribs 45 is shown as pivotally secured to the corresponding rib 39 by means of a pivot pin 46 which is arranged to permit the opposite end of the lifting rib to swing toward and from the axis of rotation of the reel. At this opposite end each leg of each of the lifting ribs is provided with a series of adjusting holes 47, the holes in the opposite legs of each lifting rib being in register to permit the insertion of a locking pin 48 which also extends through a hole provide in the corresponding rib 39. The series of holes 47 of each lifting rib are arranged concentric with the corresponding pin 46 which carries the opposite end of the lifting rib and it will be seen that by employing different pairs of the holes 47 the end of the lifting ribs 45 at the inlet end of the viner can be adjusted toward and from the beater assembly. This adjustment is normally such that the lifting ribs 45 are disposed approximately parallel with the flanges 32 of the beaters but this spacing can be adjusted to suit the particular vines being handled.

At the outlet end of the reel a cylindrical salvage screen 50 is shown as suitably attached to the end ring 36 of the reel, this salvage screen extending axially beyond the reel. The purpose of the salvage screen 50 is to permit the straw to separate and any entrained peas to fall therefrom. Such entrained peas falling from the straw in the salvage screen 50 fall through the screen. The vines to be threshed can be fed into the inlet end of the reel by means of a feeder, indicated generally at 51, which can be of any usual and well known form and the straw from the salvage screen passes through an outlet chute 52, the upper end of which is shown as located under the discharge end of the salvage screen. This chute conducts the straw onto the usual straw carrier (not shown), this straw carrier being of any usual and well known construction and operating to stack the straw at a distance from the viner.

Instead of the usual canvas curtains generally employed for enclosing the viner the top of the reel is shown as enclosed by a sheet metal hood plate 55 which extends between the end heads 10 and 11 of the viner frame and forms a semi-cylindrical hood or housing for the upper part of the reel. The lower edges of this hood 55 are shown as resting upon the longitudinal side channels 12 and 13 of the viner frame.

This semi-cylindrical hood 55 is shown as continued below the reel at one side in the form of an arcuate shelf 56, the sheet metal plate forming this shelf 56 extending between the main end heads 10 and 11 of the viner frame. The threshed peas or lima beans escaping from the perforated rubber screens 42 of the reel either fall directly upon or are directed by the arcuate shelf 56 onto a chaff separator indicated generally at 60. This chaff separator is generally in the form of an inclined apron which travels around rollers arranged parallel with the axis of the reel, the upper flight of the apron being vibrated or jarred to insure the heavy peas or lima beans rolling to the bottom in opposition to the direction of movement of this upper flight and the chaff being carried over the top of the apron and being discharged at one side of the viner. To this end the chaff separator 60 includes vertical end plates 65 which are suitably cross braced to provide a rigid frame and these end plates being secured to the end heads 10, 11 of the viner frame.

Figure 2:
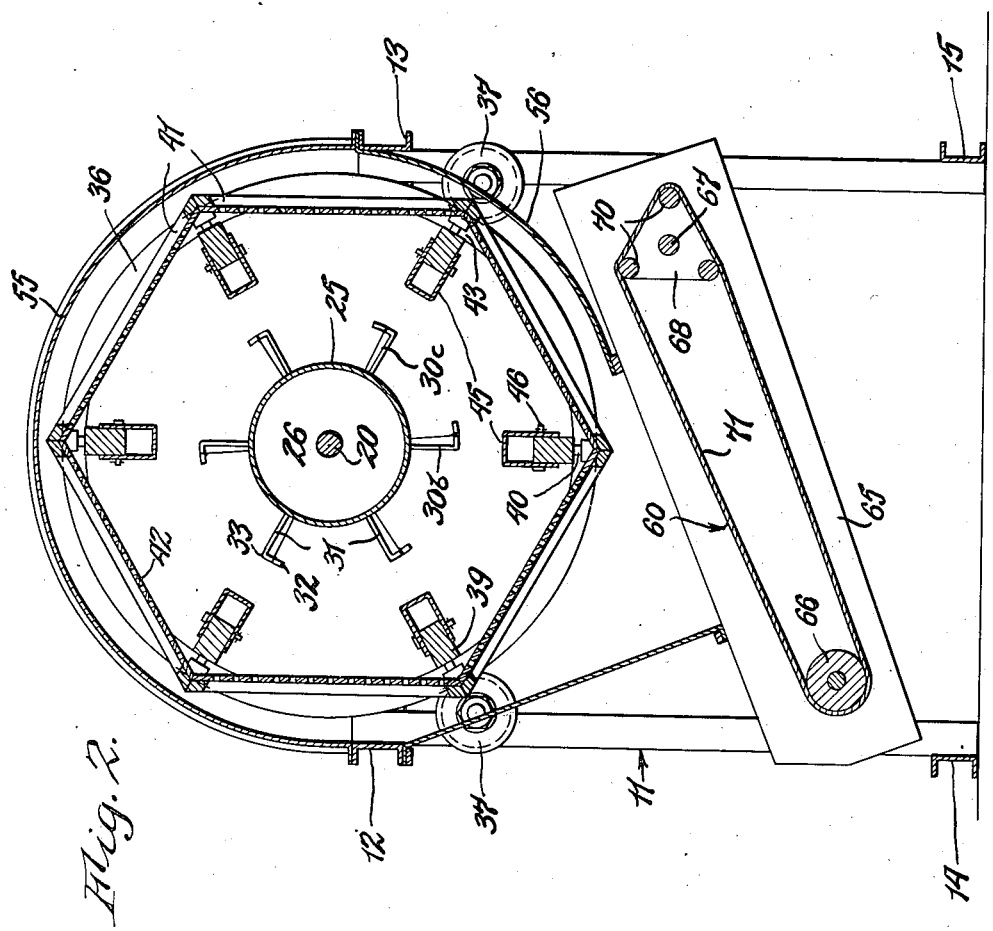
Fig. 2 is a vertical transverse section taken on line 2—2, Fig. 1.

The frame formed by the connected end plates 65 carries a lower round roller 66 which is suitably journaled at its opposite ends in the end plates 65, and an upper horizontal drive shaft 67 which is also journaled at its opposite ends in the end plates 65 and is driven by any suitable means (not shown) to rotate clockwise as shown in Fig. 2. At its opposite ends this drive shaft 67 carries triangular plates or heads 68, the corresponding apexes of which are connected by horizontal rods 70, these three rods thereby forming, in effect, a triangular roller. The endless separating apron 71 of the chaff separator passes around the lower cylindrical roller 66 and around the three rods 70 of the upper triangular roller and since this upper triangular roller is driven in a clockwise direction, as viewed in Fig. 2, the upper stretch of the apron travels upwardly so as to carry the chaff over the upper triangular roller, the peas or beans rolling down the apron and being discharged over the lower round roller 66 into a suitable receptacle or conveyer (not shown). The triangular form of the upper roller formed by the three rods 70 thereof serves to slap the upper stretch of the apron 71 up and down so as to accelerate the downward movement of the peas or beans. The chaff adheres to the apron and is carried over the top of the upper roller and is discharged on the opposite side of the viner.

In operation the harvested vines with the pods attached are brought to the viner and fed to the feeder 51 which delivers the vines continuously into the inlet end of the reel. This reel and the beater cylinder 25 are rotating in a clockwise direction as viewed in Fig. 2, the beater cylinder 25 traveling at a much higher rate of speed than the reel. The beaters 30a—30i carried by the beater cylinder are all set at a pitch which conveys the vines lengthwise of the reel to the discharge end thereof. The vines fed into the inlet end of the reel are caught by the adjacent ends of the adjustable lifting ribs 45 and the first series of beaters 30a. These vines are therefore drawn into the reel and as the reel rotates the lifting ribs 45 form pockets which allow the reel to act as a bucket elevator, lifting the vines to a position near the top of the reel. As they reach a sufficient elevation, the vines slide out of the pockets and come in contact with the rapidly revolving beaters 30a. This opens some of the pods and having acquired the speed of the beaters the vines are then thrown against other lifting ribs 45 where more pods are opened by impact.

Because of the pitch or angle of the beaters 30, the vines are moved toward the discharge end of the reel each time the beating cycle is repeated by the series of beaters 30b, 30c, etc. The separated peas are caught by the reel and since the reel is enclosed by the rubber screens 42, these peas fall through the perforations of the reel.

The peas so falling from the reel fall or are directed by the arcuate shelf 56 onto the upper stretch of the chaff separating apron 71. The peas so discharged onto the upper stretch of the chaff separating apron roll down this apron by reason of the angular disposition of this upper stretch by the chaff separating apron. This movement of the peas down the apron is accelerated by the beating action imparted to this apron by the triangular form of the bars 70 which form, together with the triangular end heads and drive shaft 67, the upper roll for this apron. The chaff clings to the upper stretch of the chaff separating apron 71 and is carried over the upper triangular drive roll where it is discharged.

The threshed straw passes from the discharge end of the reel into the salvage screen 50 where the straw is permitted to loosen and any entrained peas are permitted to fall through the straw and the screen. Following this the straw passes through the discharge chute 52 which delivers the straw to the usual straw carrier (not shown).

The invention is particularly directed to the form of the various beater plates 30 and the lifting ribs 45 with which they cooperate. It will be seen that the series of beaters 30a in the inlet zone of the reel are of comparatively small radial extent. Hence, these beaters have a comparatively slow peripheral speed. Each succeeding series of beaters 30b, 30c is successively of greater radial extent, the beaters 30i in the discharge zone of the reel having the greatest radial extent. Therefore, each of the series of beaters in the successive beating zones within the reel travel at a progressively increased peripheral speed so that as the vines move along the reel they are progressively subjected to a more violent beating action.

The tender pods which can be opened with a comparatively gentle threshing action are therefore opened by the beaters at the inlet end of the machine which are traveling at a comparatively slow peripheral speed. The tender peas from these pods therefore are threshed and fall from the inlet end of the reel without being subjected to the more violent threshing action of the subsequent beaters. Hence the arrangement of beaters as shown results in reduced injury to the tender or fancy grade of peas and a decrease in the production of splits. Since the threshing action of the successive series of beaters 30a through 30i becomes progressively more violent, the pods tend to be opened in accordance with their degree of maturity. Hence the threshing action is distributed with comparative uniformity the entire length of the reel and the pods are threshed with only that degree of violence necessary to open them thereby reducing the number of splits and the injury to the peas throughout the threshing operation.

Since the beaters are of progressively increasing radial extent as they approach the discharge end of the reel, it is necessary that the lifting ribs 45 likewise be set at an angle to the axis of the beater cylinder so that these ribs are approximately the same distance from each of the series of beaters. To this end the lifting ribs 45 are made in the form of channels which are pivoted to the ribs 39 of the reel at the discharge end thereof and are set at an angle to follow the contour of the revolving beaters, as best shown in Fig. 1. However, it is desirable with the threshing of different types of vines that the space between the beaters and these lifting ribs be adjustable, particularly at the inlet end of the reel. To permit this the lifting ribs 45 are provided with the series of holes 47 at the inlet end of the reel which permits their angular relation to the axis of the beater cylinder to be adjustably varied.

From the foregoing it will be seen that the present invention provides a viner in which the beaters, while mounted on a common cylinder, travel at progressively increased peripheral speed as they approach the discharge end of the viner, thereby to thresh the tender peas with comparative gentle action and to thresh the more mature peas with progressively increased violence. Further it will be seen that the lifting ribs are arranged to properly coact with the beaters traveling at different peripheral speeds and are further rendered adjustable to permit of securing the maximum efficiency in threshing. It will further be seen that the above operating advantages are obtained by a viner which is extremely simple in construction and operation.

I claim as my invention:

1. A viner, comprising a frame, a screened reel mounted on said frame to rotate about a generally horizontal axis and having an annular series of internal lifting ribs each extending lengthwise of said axis at an angle thereto, said lifting ribs being arranged to taper toward one another toward one axial end of said reel, said reel being provided at said one axial end thereof with an inlet opening for the vines and attached pods and at its opposite axial end with an outlet opening for the threshed straw, a beater structure arranged in said reel and rotatably mounted on said frame and including a plurality of beaters spaced axially therealong between said inlet and said outlet and extending radially outward therefrom to travel in close proximity to said lifting ribs and coact with said lifting ribs in threshing said pods, means for adjusting the effective length of said beaters, means for rotating said reel and beater structure at different speeds, said beaters being of different effective length and progressively extending radially outward a greater extent from said inlet toward said outlet to arrange the outer ends of said beaters generally parallel with the adjacent lifting ribs and to provide a progressively increasing peripheral speed of said beaters toward said outlet opening with the same angular speed of said beaters, said beaters being arranged to travel in close proximity to said lifting ribs to coact therewith in threshing said pods and said beaters being arranged to convey said vines axially through said reel, and means for adjustably moving one end of each of said lifting ribs radially of said reel to adjust the angularity of said lifting ribs relative to the axis of said reel.

2. A viner, comprising a frame, a screened reel mounted on said frame to rotate about a generally horizontal axis and having an annular series of internal lifting ribs each extending lengthwise of said axis at an angle thereto, said lifting ribs being arranged to taper toward one another toward one axial end of said reel, said reel being provided at said one axial end thereof with an inlet opening for the vines and attached pods and at its opposite axial end with an outlet opening for the threshed straw, a beater structure arranged in said reel and rotatably mounted on said frame and including a plurality of beaters spaced axially therealong between said inlet and said outlet and extending radially outward therefrom to travel in close proximity to said lifting ribs and coact with said lifting ribs in threshing said pods, means for rotating said reel and beater structure at different speeds, and means for adjustably moving one end of each of said lifting ribs radially of said reel to adjust the angularity of said lifting ribs relative to said axis of said reel.

3. A viner, comprising a frame, a reel comprising rings rotatably supported on said frame, an annular series of ribs fixed to and connecting said rings, a screen wall interposed between said rings and enclosing the sides of said reel, an annular series of internal lifting ribs, means adjacent one end of said reel for pivotally securing one end of each of said lifting ribs to the end of a corresponding fixed rib to swing about an axis extending perpendicularly to the corresponding radius of said reel, and means adjacent the opposite end of said reel for adjustably securing the corresponding ends of said lifting ribs to the adjacent ends of said fixed ribs to permit of arranging said lifting ribs with varying degrees of taper toward one another, a beater structure arranged in said reel and rotatably mounted on said frame and including a plurality of beaters spaced axially therealong and extending radially outward to travel in close proximity to said adjustable lifting ribs and to coact with said lifting ribs in threshing said pods, and means for rotating said reel and beater structure at different speeds.

4. A viner, comprising a frame, a reel comprising rings rotatably supported on said frame, an annular series of ribs fixed to and connecting said rings, a screen wall interposed between said rings and enclosing the sides of said reel, an annular series of internal lifting ribs, means adjacent one end of said reel for pivotally securing one end of each of said lifting ribs to the end of a corresponding fixed rib to swing about an axis extending perpendicularly to the corresponding radius of said reel, and means adjacent the opposite end of said reel for adjustably securing the corresponding ends of said lifting ribs to the adjacent ends of said fixed ribs to permit of arranging said lifting ribs with varying degrees of taper toward one another, a beater structure arranged in said reel and rotatably mounted on said frame and including a plurality of beaters spaced axially therealong and extending radially outward to travel in close proximity to said adjustable lifting ribs and to coact with said lifting ribs in threshing said pods, and means for rotating said reel and beater structure at different speeds, said beaters being of different adjustable effective length and progressively extending radially outward a greater extent from said opposite end of said reel to said one end thereof to arrange the outer ends of said beaters generally parallel with the adjacent lifting ribs and to provide a progressively increasing peripheral speed of said beaters with the same angular speed of said beaters.

WILLIAM DE BACK.